Dec. 23, 1958

C. B. DALE 2,866,010

POCKET TAPE RECORDER

Filed Dec. 17, 1953

3 Sheets-Sheet 1

INVENTOR.

COLIN B. DALE

BY [signature]

ATTORNEY

Dec. 23, 1958 C. B. DALE 2,866,010

POCKET TAPE RECORDER

Filed Dec. 17, 1953 3 Sheets-Sheet 2

INVENTOR
COLIN B. DALE
BY [signature]
ATTORNEY

INVENTOR
COLIN B. DALE
BY [signature]
ATTORNEY 2,866,010
Patented Dec. 23, 1958

2,866,010

POCKET TAPE RECORDER

Colin B. Dale, Oak Park, Ill., assignor to Webcor, Inc., a corporation of Illinois Application December 17, 1953, Serial No. 398,764

7 Claims. (Cl. 179—100.2)

This invention concerns magnetic tape recorders, and particularly a compact pocket-size recorder consisting of three separate units, namely a seound-recording unit, a power or motor unit which cooperates with and drives the sound recording unit and a sound input-output current supply and amplifying unit.

The objects of the invention will be apparent from the description and from the claims which follow it.

Referring to the drawings, which illustrate one embodiment of the invention,

Figures 6, 6A, 6B:
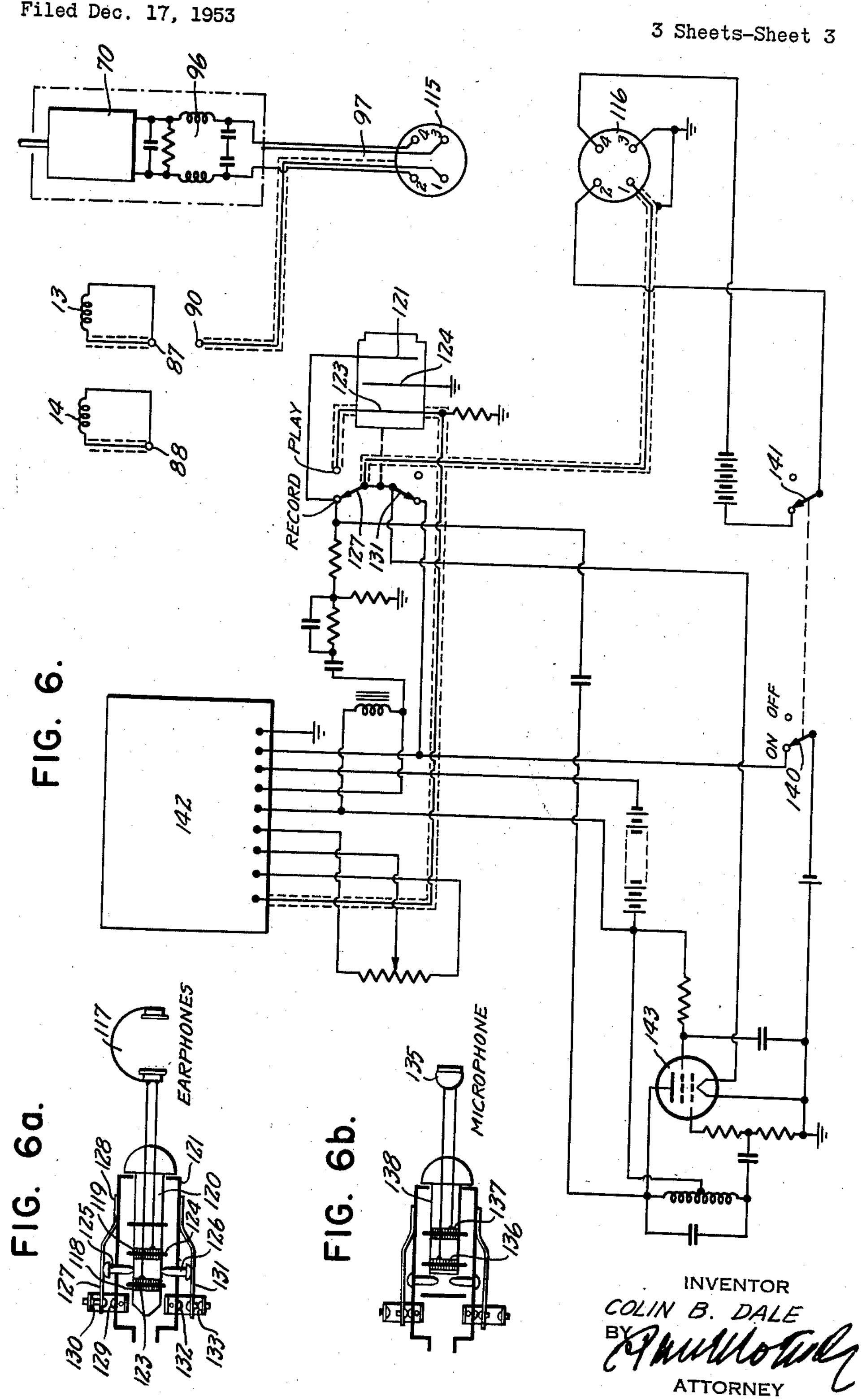

Figs. 6, *6a*, *6b* are diagrams of the electrical system associated with the device.

The magnetic tape 10 on which sound is to be recorded is drawn from a reel 12, over recording heads 13 and 14 and onto a reel 11. The two reels, the recording heads and their mounting constitute the recording unit 15, enclosed within the open bottomed case 16 of metal, plastic or other suitable material.

The reels 11 and 12 are preferably of the construction disclosed in my copending application Ser. No. 309,097, filed September 11, 1952, though any other suitable construction may be employed. The reels have parallel side walls 17 and 18 turned inward around their circumference at 19 and 20 in order to hold the tape within the confines of the side walls.

Reel 11 has a central opening 21 which allows it to seat on a hub 22 of a worm gear 23. When the reel is seated on the hub, the two are keyed together by means of a radial key such as 24 formed on the hub, which engages a slot such as 25 in opening 21. The hub 22 and the worm gear 23 are held fixedly together, for example by screws 26, and thus rotate as a unit. Hub 22 is rotatably mounted near one end of a transverse shaft 27, and is carried on bearings 28. Reel 12 is similarly seated on hub 29 which carries gear 30 and which is mounted near the other end of shaft 27.

Midway along its length, shaft 27 is mounted in a four-armed spider-like frame 31 and is located axially with respect to the spider between a shoulder 32 formed on the shaft and a spacer washer 33. Hub 22 is held on the shaft by a spring 34, the centre of which fits over the shaft where it is held by a retaining ring 36 seated in a groove 37, and the ends of which rest on a circular shoulder 35 in opening 21 of the hub.

To avoid uneven operation of the device resulting from backlash of the tape when the reels are started and stopped, the retaining ring 36 is so positioned as to hold the spring 34 under tension, urging the hub 21 into light frictional contact with shoulder 32. Hub 29 is similarly held in frictional contact with spacer washer 33 by spring

38. Thus the hubs, and the gears and reels carried on them, are held in fixed, axially spaced relationship on the shaft, separated by shoulder 32, spacer washer 33 and by spider 31 which is mounted inside casing 16 by mounting brackets 40 and 41 carried on the ends of the two upper spider legs 42 and 43.

The ends of the two lower frame legs 44 and 45 are formed into sleeves 46 and 47 each of which surrounds a bushing of insulating material such as 48 which projects below the sleeves to a point approximately flush with the open bottom of case 16.

Figure 1:
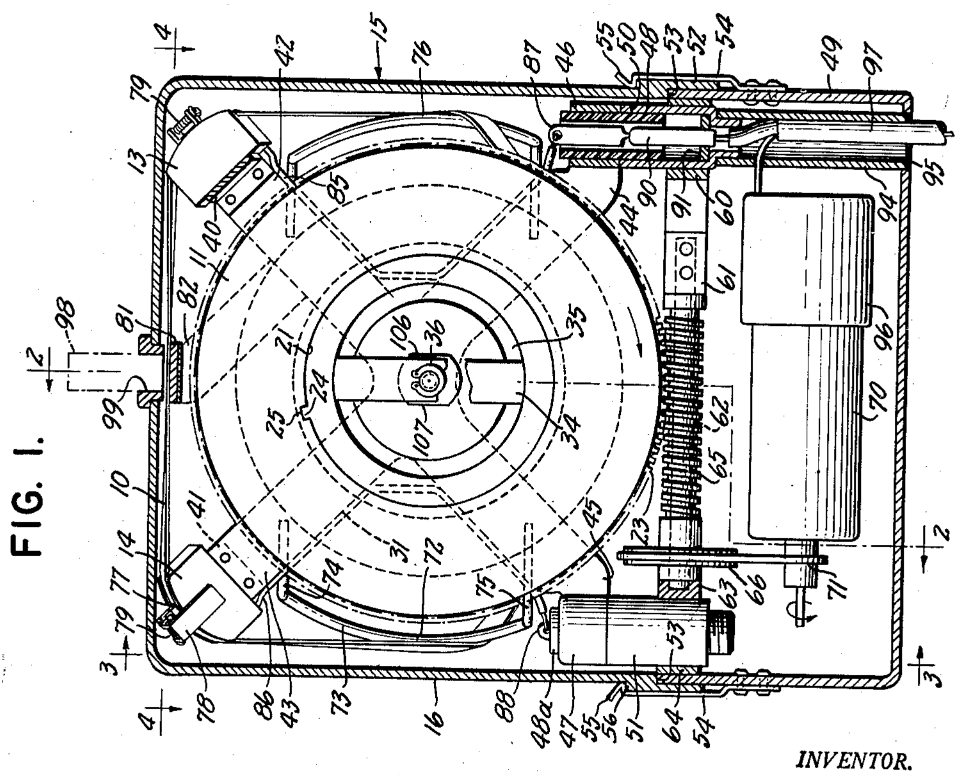
Fig. 1 is a front view partly in section of the sound recording and motor units of the device.

When the open top of motor case 49 and the open bottom of the case 16 are pressed together, the two bushings 48 and **48*a* slide within sleeves 50 and 51 which project upward from case 49, and when the two cases are in the relationship shown in Fig. 1, the tops of sleeves 50, 51 abut the bottom faces of sleeves 46 and 47. At the same time the open top of case 49 nests within a flange 52 surrounding the open bottom of case 16, until it rests against shoulder 53 on the inside of case 16. In this way the correct mechanical relationship of the two cases is assured, and they are held together in this relationship by spring arms 54, the ends 55 of which engage the external shoulder 56 on case 16**.

Sleeve 50 is fixedly held in a mounting 60 within the motor case 49 and flush with its open top. Mounting 60 carries bearing 61 in which is journalled one end of a traverse shaft 62, the other end of which is journalled in bearing 63 carried by mounting 64 which holds sleeve 51. A worm 65 and a pulley 66 are both keyed to the shaft 62, and an electric motor 70 mounted in case 49 below shaft 62 drives the worm and the pulley through a belt 71.

Figure 2:
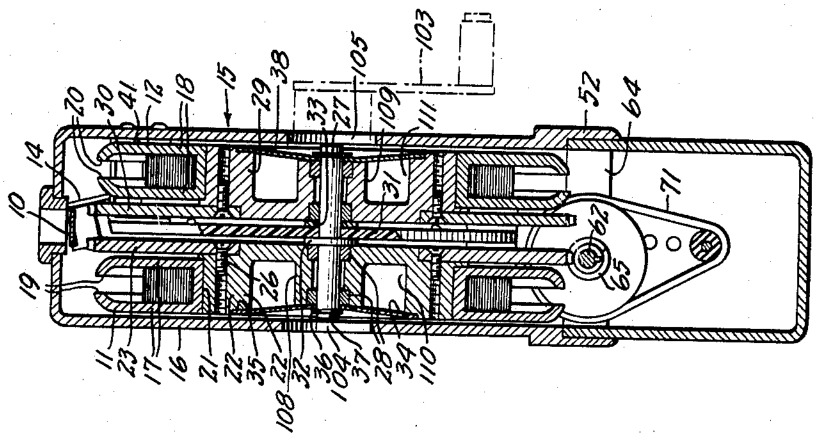
Fig. 2 is a section taken on the line 2—2 of Fig. 1.

The shaft 62 is mounted slightly off-center in case 49 so that when the cases 49 and 16 are fitted together as in Figs. 1 and 2 the teeth of the worm engage those of the gear 23 and the motor 70 can drive reel 11 to draw the tape from reel 12 onto reel 11. To reverse the direction in which the tape moves, case 49 is removed from case 16 and turned so that sleeve 51 is at the right as seen in Fig. 1, instead of being at the left. With the cases fitted together in this relationship, the teeth of the worm engage the teeth of gear 30 and the motor can draw the tape from reel 11 back onto reel 12. The two cases can thus be fitted together in such a way that motor 70 (always turning in same direction) can drive either of the two reels to wind the tape from one reel to the other and back again over the two recording heads 13 and 14.

The recording heads 13 and 14 are supported on the mounting brackets 40 and 41 on the ends of spider legs 42 and 43 in the upper corners of the case 16 out of the way of the gears and reels and in a plane substantially midway between the two reels, one head being pointed to permit the guiding of the tape from reel 11 to reel 12, and the other for guiding the tape from 12 to 11. By "pointed," I mean that the working surface of the magnetic head has its axis at such an angle to the reels and the guide yokes, that the tape emerging from one will lie flat on the surface and will be directed towards the other reel.

Figure 4:
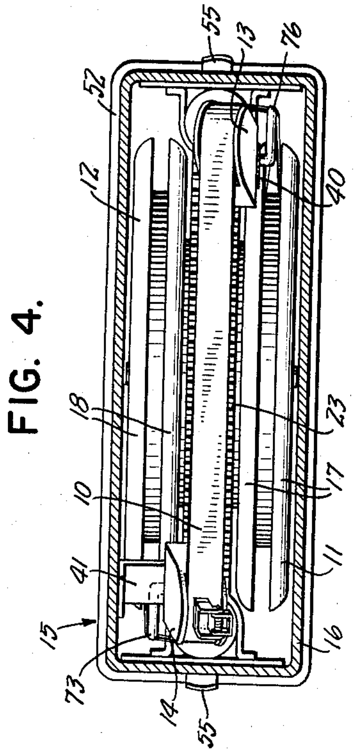
Fig. 4 is a view taken on the line 4—4 of Fig. 1.
Figure 5:
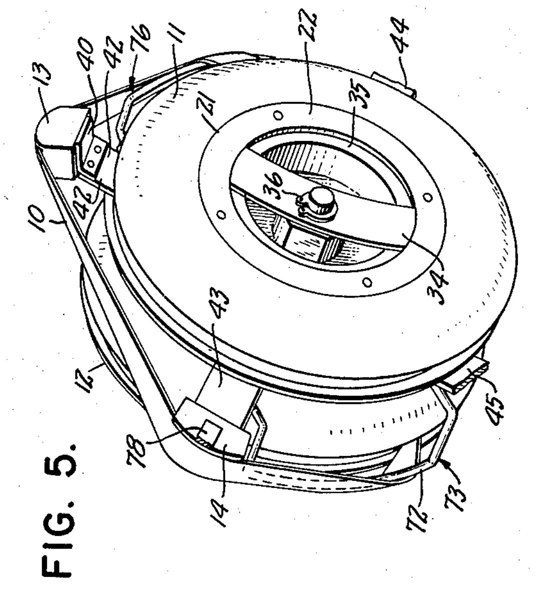
Fig. 5 is a perspective view showing the reels and the way in which the tape is guided from one reel to the other.
Figure 3:
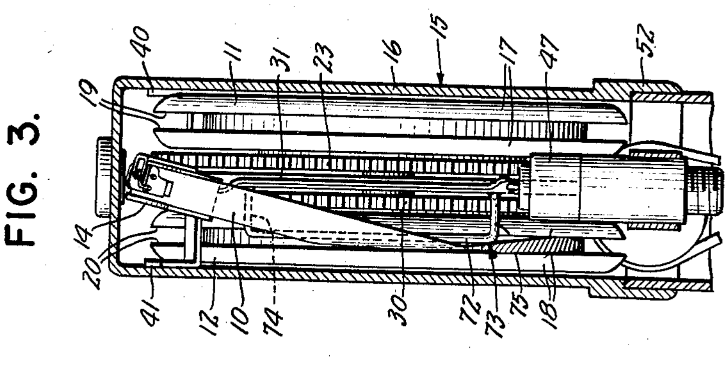
Fig. 3 is a view taken on the line 3—3 of Fig. 1.

As is best shown in Fig. 3, after leaving, for example, reel 12, the tape is led towards head 14 in a plane at an angle to the plane of the reel. Between the heads 14 and 13, the tape travels, as shown in Fig. 4, in a plane parallel to the planes of the reels and midway between them.

In order that the two edges of the tape will have the same distance to travel, and so that the pull on the tape will be evenly divided across its width as it moves out of one plane and into the other, the tape is led around the arcuate yoke portion 72 of a guide wire 73 as it leaves reel 12, and the head 14 is pointed at an angle on its mounting so that its recording surface lies at right angles to the plane in which the tape moves between guide wire 73 and the head.

As seen in Fig. 1, the yoke portion of the guide wire 73 occupies an arc concentric with, and of somewhat greater diameter than, that of reel 12, and is positioned axially so that its outer side as seen in Fig. 3 is substantially midway between the planes of the sides 18 of reel 12. The yoke is held in this position by offset leg portions 74 and 75 welded or otherwise attached to the legs 43 and 45 of the spider.

In passing from reel 12 around the guide wire 73, the tape is twisted through approximately a quarter turn, so that it passes without difficulty through the narrow opening between the in-turned edges 20 of the reel.

A second guide wire 76 similar to guide wire 73 is mounted on spider legs 42 and 44. It occupies the same position with respect to reel 11 as guide wire 73 occupies with respect to reel 12, and fulfills a similar function as the tape passes between the head 13 and reel 11. Head 13 is also set at an angle so that its recording surface lies at right angles to the plane in which the tape moves between it and the guide wire 76. Between the recording heads 14 and 13, the tape is twisted by the sum of the two angles at which the two heads are set, since they are tilted in opposite directions.

Apart from tilting the heads so that the pressure of the tape will be evenly distributed between its two edges as it moves across them, the tape is maintained in continuous contact with the recording surfaces of the heads by pressure pads 77 of soft non-abrasive material such as felt which are provided on each head, hingedly mounted on brackets 78 and urged towards the heads by torsion springs 79.

Midway between the recording heads the tape passes over a supporting pad 81 on an arm 82 mounted on leg 42 of the spider.

Recording heads 13 and 14 are connected by cables 85 and 86, fastened respectively to spider legs 42, 44 and 43, 45, to contact jacks or clips 87, 88 held enclosed within the insulated bushings 48 and 48*a*. When bushing 48 is pushed within sleeve 50, clip 87 makes electrical contact with a plug 90 seated on a disc 91 held within sleeve 50. The lower portion of sleeve 50 is fitted into a conduit 94 leading to an opening 95 in the bottom of case 49. The plug 90 and the motor filter 96 are connected to a four-pronged plug 115 through a cable 97, part of whose length is enclosed in conduit 94. Plug 115 cooperates with jack 116 to connect the device with the sound input-output, current supply and amplifying unit.

Thus, when case 16 is fitted onto case 49 as shown in Fig. 1, head 13 is energized and worm 65 meshes with gear 23 to draw the tape from reel 12 to reel 11. The head 13 is made so as to record on only one half the width of the tape, and the head 14 so as to record on the other. When the tape is fully wound onto reel 11, and head 13 has recorded on half its width, case 49 is withdrawn from case 16, turned and replaced so that the worm meshes with gear 30 to wind the tape from reel 12 back onto reel 11. In this position it is clip 88 that is connected with plug 90 and head 14 that is energized so as to record on the other half of the tape.

The magnetic impression of sound may be erased from the full width of the tape by inserting a permanent magnet 98 in an opening 99 in the top of case 16 above the supporting pad 81.

So that the tape may be wound more rapidly than the normal recording or play-back speed at which the motor winds it, a handle 103 is provided which may be inserted in one or the other of two openings 104, 105 concentric with the axis of the shaft 27 in the sides of case 16. The handle is provided with two prongs (not shown), the opposing faces of which are flat and cooperate with flats such as 106 and 107 machined on bosses 108 and 109 which project from the base of central recesses 110 and 111 in hubs 22 and 29.

When it is desired to record or play back, plug 115 is inserted into jack 116. For play back, earphones 117 connected to the conducting segments 118 and 119 of a plug 120 of insulating material are employed. The plug 120 is inserted into a receptacle or jack 121 of insulating material. The conducting segment 118 engages contact 123, and the conducting segment 119 engages grounded contact 124 mounted within jack 121. The end of the insulated plug 120 engages and pushes out of receptacle 121, two insulated lugs 125, 126. The lug 125 engages a leaf spring 127 attached at 128 to the outside of the receptable 121 and pushes it out of engagement with contact 129 mounted on receptacle 121. The spring 127 is pushed into engagement with a contact 130 mounted on the casing 121. Similarly, the lug 126 engages a leaf spring 131 attached to the receptacle 121 and moves it out of engagement with contact 132 and into engagement with contact 133 mounted on the receptacle 121. In Fig. 6, the two leaf springs 127 and 131 are indicated as wipers which are moved from a "record" into a "play" position, the earphones 117 being connected with the circuit in the latter position.

If it is desired to dictate into the machine, then the earphone plug 120 is removed from jack 121 whereupon springs (not shown) return the lugs 125, 126 into their normal positions in which the springs 127, 131 return to their "record" position. A microphone 135 which is connected with conducting segments 136 and 137 of a plug of insulating material 138 is inserted into the opening of receptacle 121. The plug 138 is shorter than the plug 120 so that the contact strips 136 and 137 will engage contacts 124 and 123 of the receptacle and the end of the plug 138 will not reach the lugs 125, 126, whereby springs 127, 131 will be left in the "record" position.

As indicated in Fig. 6, the circuit is provided with the conventional starting switch 140, 141 by means of which its power may be turned on and off with respect to jack 116, amplifier 142 and oscillator 143.

I claim:

1. In a portable magnetic sound tape recording device, two parallel reels, each reel having side walls adapted to contact the edges of a record tape and turned in at their peripheries, said side walls defining continuous openings between their peripheries whereby radial movement of the tape to and from a reel is allowed only when the tape is twisted about its longitudinal axis, a gear of each reel, a frame between said reels, two sound recording heads, means for mounting one head in association with one reel longitudinally to the tape travel but tilted transversely towards the second reel, means for mounting the second head in association with the second reel longitudinally to tape travel but tilted transversely to the first reel, two tape guides mounted on said frame having yokes for guiding the tape to and from said reels, said yokes being diametrically displaced with respect to one another and aligned with the openings between the peripheries of the reel side walls, and a motor for driving said gears.

2. In a portable magnetic sound recording device, two parallel reels, a gear wheel for carrying each reel, a frame between said gears having four legs, a first sound recording head mounted on the end of a first leg, a second sound recording head mounted on the end of a second leg, a magnetic recording tape having its ends fastened to said reels, contacts at the ends of the third and fourth legs, conductors connecting the contacts to the heads, and an electric motor for driving said gears.

3. In a portable magnetic sound tape recording device, two parallel reels, each reel having side walls adapted to contact the edges of a record tape and turned in at their peripheries, whereby radial movement of the tape to and from a reel is allowed only when the tape is twisted about its longitudinal axis, a gear wheel for carrying each reel, a frame between said gears having four legs, two sound recording heads, means for mounting one head on one leg in association with one reel longitudinally to tape travel but tilted transversely towards the second reel, means for mounting the second head on a second leg in association with the second reel but tilted transversely to the first reel, two tape guides mounted on said frame having yokes for guiding the tape to and from said reels, said yokes being diametrically displaced with respect to on another and aligned with the openings between the peripheries of the reel heads, contacts at the ends of the third and fourth legs, conductors connecting the contacts to the heads, and an electric motor for driving said gears.

4. In a portable magnetic sound recording device, a first and a second casing section cooperating with one another to form a closed container, the first section having one end open and enclosing a sound recording unit comprising two parallel reels within the confines of said section, a gear wheel for carrying each reel, a frame between said gears having four legs, a transverse shaft aligned with an opening in a side wall of said first casing section passing through central openings in said gears and the frame, frictional coupling between the shaft and each reel, a first sound recording head mounted on the end of a first leg, a second sound recording head mounted on the end of a second leg, a magnetic recording tape having its ends fastened to said reels, brackets at the ends of the third and fourth legs, each bracket enclosing a clip having two insulated contacts, conductors connecting the contacts of one clip to one head and the contacts of the other clip to the second head, the second casing section having one end open and a motor unit comprising an electric motor and a worm shaft driven by it adapted to engage the teeth of one gear when the two sections are assembled, an insulating sleeve projecting from the second section on the end of which one of said brackets rests when the sections are assembled, a contact plug enclosed by said sleeve and cooperating with the clip within the bracket resting on said sleeve, and a bushing projecting from the second section on which the other bracket rests.

5. In a portable magnetic sound recording device, a first and a second rectangular casing section cooperating with one another to form a closed container, the first section having one end open and enclosing a sound recording unit comprising two parallel reels within the confines of said section, two gear wheels having gear teeth projecting through the open end of said first section, a hub for each gear on which a reel is carried, a frame between said gears having four legs projecting towards the four corners of the first section, a transverse shaft aligned with an opening in a side wall of said first casing section passing through central openings in said gears and said frame, friction coupling between the shaft and hubs comprising a leaf spring fastened to the shaft and pressing the associated hub axially on the shaft, a first sound recording head mounted on the end of a first leg in one enclosed corner of said first section, a second sound recording head mounted on the end of a second leg in the second enclosed corner of said first section, a magnetic recording tape having its ends fastened to said reels, two tape guides, each having a yoke projecting beyond a reel and aligned with the opening thereof, one yoke having arms fastened to the first and third, and the other arms fastened to the second and fourth frame legs, a pressure pad for each recording head to hold the tape in place, a platform for the tape below an opening in the closed end wall of the first casing section, a permanent magnet frictionally held in the last-mentioned opening, brackets at the ends of the third and fourth legs, each bracket enclosing a clip having two insulated contacts, conductors connecting the contacts of one clip to one head and the contact of the other clip to the second head, said conductors being fastened to the legs, the second casing section having one end open and a motor unit comprising an electric motor and a worm shaft driven by it, mountings having bearings for said worm shaft end walls of said second section and supporting it at right angles to said transverse shaft and in engagement with the teeth of one gear when the two sections are assembled, an insulating sleeve projecting from one mounting and on the end of which one of said brackets rests when the sections are assembled, a contact plug enclosed by said sleeve and cooperating with the clip within the bracket resting on said sleeve, and a bushing on the other mounting on which the other bracket rests.

6. In a portable magnetic sound recording device, a first and a second rectangular casing section cooperating with one another to form a closed container, the first section having one end open and enclosing a sound recording unit comprising two parallel reels within the confines of said section, each reel having side walls adapted to contact the edges of the tape and turned in at their peripheries, whereby radial movement of the tape to and from a reel is allowed only when the tape is twisted about its longitudinal axis, a gear wheel for carrying each reel and having gear teeth projecting through an open end of said first section, a frame between said gears having a hub from which four legs project symmetrically towards the four corners of the first casing section, a transverse shaft aligned with an opening in a side wall of said first casing section passing through central openings in said gears and the frame, frictional coupling between the shaft and each reel, two sound recording heads, means for mounting one head on one leg in one enclosed corner of said first section, and tilted transversely from one reel towards the second reel, means for mounting the second head on a second leg in the second enclosed corner of the first section and tilted transversely from the second reel to the first reel, two tape guides mounted on the legs of said frame having yokes for guiding the tape to and from said reels, said yokes being diametrically displaced with respect to one another and aligned with the openings between the peripheries of the reel heads, a pressure pad for each recording head to hold the tape in place, a platform for the tape below an opening in the closed end wall of the first casing section, a permanent magnet frictionally held in the last mentioned opening, brackets at the ends of the third and fourth legs, each bracket enclosing a clip having two insulated contacts, conductors connecting the contacts of one clip to one head and the contacts of the other clip to the second head, said conductors being fastened to the frame legs, the second casing section having one end open and a motor unit comprising an electric motor and a worm shaft driven by it, mountings having bearings for said worm shaft in end walls of said second section and supporting it at right angles to said transverse shaft and in engagement with the teeth of one gear when the two sections are assembled, an insulating sleeve projecting from one mounting bearing and on the end of which one of said brackets rests when the sections are assembled, a contact plug enclosed by said sleeve and cooperating with the clip within the bracket resting on said sleeve, and a bushing on the other mounting on which the other bracket rests.

7. In a portable magnetic sound recording device for handling an elongated record, two reels mounted in adjacent coaxial relationship, the reels each having side walls for confining the record, a driven element on each reel, a frame interposed between said reels and being equipped with a plurality of legs, two sound recording heads mounted on respective legs of said frame which are spaced apart from one another a distance approximating a diameter of said reels, one of said heads being in association with one of the reels and the other of the heads being in association with the other of the reels, carried by other of said legs for connection with said heads, a record guide mounted on each side of the reels and being spaced outwardly therefrom on a line coincident with a diameter of the reels and being spaced angularly from said heads, and means for driving said driven elements including a motor and a driving member engaging one of said driven elements.

References Cited in the file of this patent

UNITED STATES PATENTS 2,321,812 Heller ---------------- June 15, 1943
2,490,771 Begun ---------------- Dec. 13, 1949